April 1, 1969    J. V. B. MOZDZANOWSKI    3,435,741
DOUBLE VIBRATION ROLLER
Filed Dec. 9, 1966    Sheet 1 of 4

Inventor:
JOACHIM V. B. MOZDZANOWSKI
By: Stevens, Davis, Miller & Mosher
ATTORNEYS

United States Patent Office 3,435,741
Patented Apr. 1, 1969

3,435,741
DOUBLE VIBRATION ROLLER
Joachim V. B. Mozdzanowski, Boppard (Rhine), Germany, assignor to Bopparder Maschinenbaugesellschaft m.b.H., (Bomag) Boppard (Rhine), Germany
Filed Dec. 9, 1966, Ser. No. 600,453
Int. Cl. E01c *19/24*
U.S. Cl. 94—50                                             3 Claims

ABSTRACT OF THE DISCLOSURE

A ground compacting apparatus having a frame with a double vibration roller mounted thereon. Imbalance oscillation generators are located on the front and rear of the frame outside the rollers and comprise masses at the front and rear which rotate at the same speed with a 180° phase difference and additional fixed masses.

---

The present invention relates to double vibration rollers. In the design of such rollers it is necessary, in contradistinction, for instance, to plate shakers, to select an amplitude of the parts acting on the ground, and therefore of the roller bodies or roller drums, which is not too large. The time during which the roller bodies rest on the ground must be sufficiently long to maintain the static friction which is necessary for the advancing drive, in which connection it must be borne in mind that the rollers must also be able to handle upward slopes. By these limiting conditions with regard to the amplitude, the impact energy transferred to the ground is limited with a given mass of the vibration roller. The energy which can be transferred futrhermore depends on the ratio of the speed of rotation of the imbalance to the natural frequency of the ground. A measure of this is furthermore the shift in phase between position of imbalance and movement phase.

The inventor has set himself the task, in the case of a double vibration roller with roller bodies swinging in phase opposition, of considerably increasing the impact energy without increasing the amplitude, while, on the other hand, increasing the total weight of the vibration roller as little as possible, or even maintaining it substantially constant.

A double vibration roller with vibration generators consisting of imbalance masses which rotate in synchronism with 180° phase shift is to be considered a rotary oscillation system, the center of rotation of which lies approximately in the vertical plane between the two roller bodies and approximately in the plane of the shafts or axles of said roller bodies. If now the vibration generators are arranged—as proposed in accordance with the invention—at a considerable distance from the center of rotation of this rotary oscillation system, namely, on the sides of the roller bodies facing away from each other, and approximately in the plane which contains the axles of the roller bodies, then the impact energy which is transmitted by the roller bodies to the ground will be greater the greater the distance of the axes of rotation of the imbalance vibration producers from the center of rotation of the rotary oscillation system of the roller, since the kinetic energy which is transmitted to the ground is dependent on the moment of inertia around the center of rotation D of the system (cf. FIG. 3), the mass which increases the moment of inertia not only including the imbalance but also the shaft and the connecting tube or the housing. Both in the case of double vibration rollers whose roller bodies swing in the same phase and in the case of rollers whose roller bodies swing in phase opposition, the imbalance oscillation generators have been arranged along the axis of the roller bodies, between said axes or over the axles, but always at only a relatively small horizontal distance from the vertical transverse plane between the roller bodies and from the center of rotation of the swinging system. Therefore there was not realized the great importance of the lateral spacing of the imbalance vibration generators as swinging mass or, in general, the mass distribution, referred to the center of rotation D, for double vibration rollers which swing in phase opposition. It was believed that no distinction is to be made with respect to the arrangement of the imbalance vibration generators between double vibration rollers whose roller bodies swing in phase and those whose roller bodies swing in phase opposition.

In order to explain the above from a mathematical-physical basis, a system 1 (known roller) will be compared with a system 2 (roller in accordance with the invention). The systems 1 and 2 (FIGS. 5 and 6) are assumed to have the same tire spacings $l_1$ and the same weights G. The rotation deflections $\alpha$ and the speeds of rotation of the exciting shafts are assumed also to be the same. In order to obtain a greater energy of rotation in system 2 than in system 1, the moment of inertia of system 2 (FIG. 6) must first of all be greater than that of system 1 (FIG. 5). While maintaining equal total weights, it is thereby possible to shift the masses of system 2 outwards with respect to the axis of rotation—expressed mathematically, the distances $i$ of the mass $m$ are made larger in the sum for the total moment of inertia $I_{\text{tot}} = \Sigma m \cdot i^2$. Furthermore, the exciting moment must be increased to such an extent that system 2 is excited with an increased moment of inertia with the same angular deflections $\alpha$ as system 1. This, in its turn, can be achieved by increasing the imbalance force while retaining the exciting lever arms $l_2/2$ or while retaining the imbalance forces of system 1 with a lengthening of the imbalance-force lever arms, i.e., by shifting the exciting shafts outward from the tires to a distance $l_2/2$ from the axis of oscillation.

The foregoing can be expressed mathematically as follows. The energy of rotation of the double vibration roller must be equal to the exciting moment of the two imbalance exciting shafts or:

$$\frac{J_s \cdot \omega_1^2}{2} = P l_2$$

$$\omega_1 = 2\frac{V}{l_1}$$

$$V = \sqrt{\frac{P \cdot l_1^2 \cdot l_2}{2 \cdot J_s}}$$

$J_s$ = Total moment of inertia of the masses around the Axis of oscillation.
$\omega_1$ = Angular velocity of oscillation.
P = Exciting force of an imbalance shaft.
$l_2/2$ = Distance of the exciting shaft from the axis of Oscillation for system 2.
$l_1/2$ = Distance of tire from axis of oscillation.
$v$ = Velocity of oscillation at the resting point of the tire.

As can be noted from the physical relationships, the problem which forms the basis of the invention can also be solved by providing additional masses on the rocker arms in order to increase the energy of impact with practically constant amplitude at a considerable distance from the center of rotation of the rotary oscillation system. This can be done by increasing the thicknesses of the material of the rocker arms, i.e., the lateral parts of the frame and its transverse connections at the outermost ends, or by applying fixed additional masses. Easily removable additional masses are, however, preferably employed.

In order to achieve the purpose of the invention, one can also provide both embodiments, namely, imbalance producers arranged relatively far towards the outside and additional masses located relatively far towards the outside.

In one preferred embodiment, the oscillation producers are arranged in housings which represent the transverse connection of the rocker arms. In this way there is obtained a rigid construction of the frame of the roller at only slight expense.

If one selects the construction in accordance with the invention in which the imbalance vibration generators are pushed out of the shafts or hollow shafts of the roller bodies towards both sides of the roller drums and therefore towards the front and read ends, respectively, of the roller, one has the advantageous possibility of simplifying the development of the support for the roller bodies and thereby reducing the expense. While when the imbalance vibration generators are arranged coaxially to the roller drums relatively large anti-friction bearings for the supporting of the drums on the housings of the imbalance vibration generators are required, it is possible with the aforementioned embodiment in accordance with the invention to use relatively small ball bearings for the roller bodies.

Embodiments of the subject matter of the invention are shown in the drawing in which.

Figure 5:
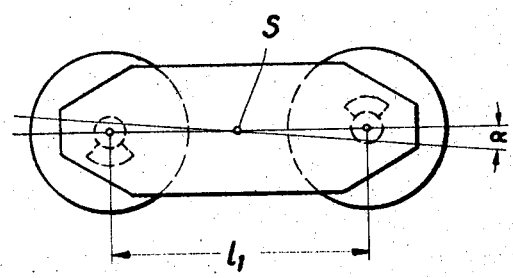
Figure 6:
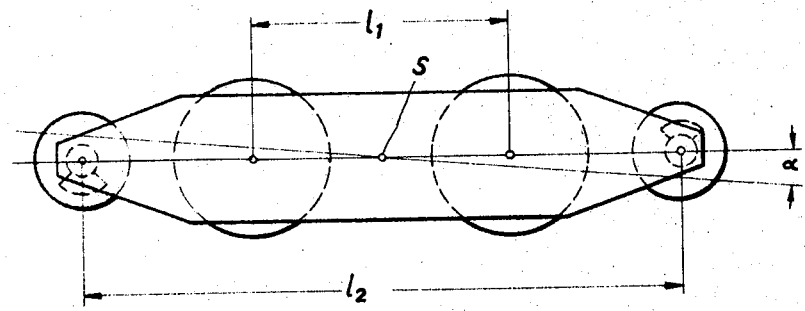

FIGS. 5 and 6 show system 1 and system 2, respectively, serving to explain the statements given above.

Figure 1:
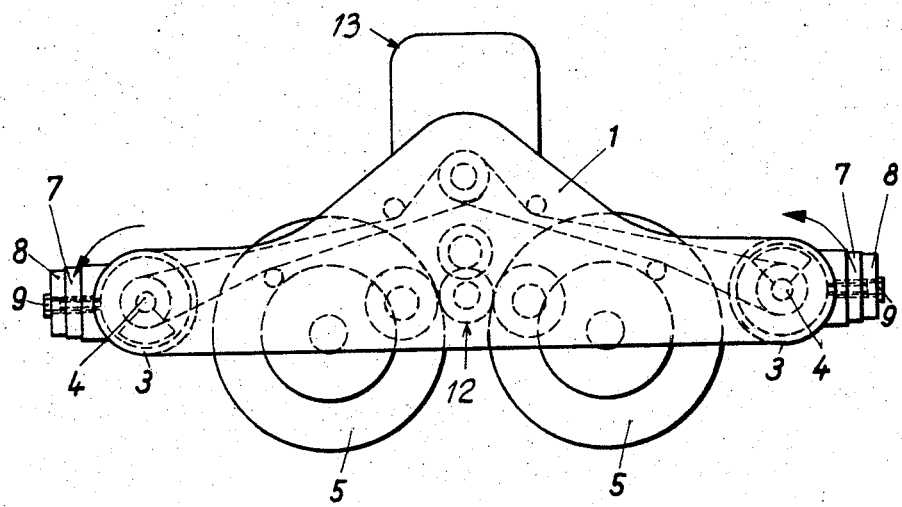
FIG. 1 shows a double vibration roller in accordance with the invention, as seen in side view.

The roller is developed in customary manner of the rocker arms 1 and the roller bodies 5 which are supported therein and the drive for which is indicated by gears 12 driven by motor means schematically represented at 13. In accordance with the invention, the imbalance vibration generators 4 arranged in the housings 3 are provided at the two ends of the roller and therefore on the sides of the roller bodies 5 facing away from each other. In this way there is obtained an increase in the impact energy. In addition, masses designated as 7 and 8 are provided at the outer ends of the rocker arms 1. In the embodiment shown in FIG. 1 therefore there are employed both main solutions for the invention, which, however, may also be used individually. Upon the attachment of the additional masses 7 and/or 8 by means of the screws 9, one therefore has a double vibration roller in which an increase in the impact energy is obtained without a substantial increase in the total weight merely by increasing the moment of inertia about the point D.

The dividing up of the additional masses 7 and 8 will be effected in accordance with practical requirements and a further subdivision may possibly be provided.

Figure 2:
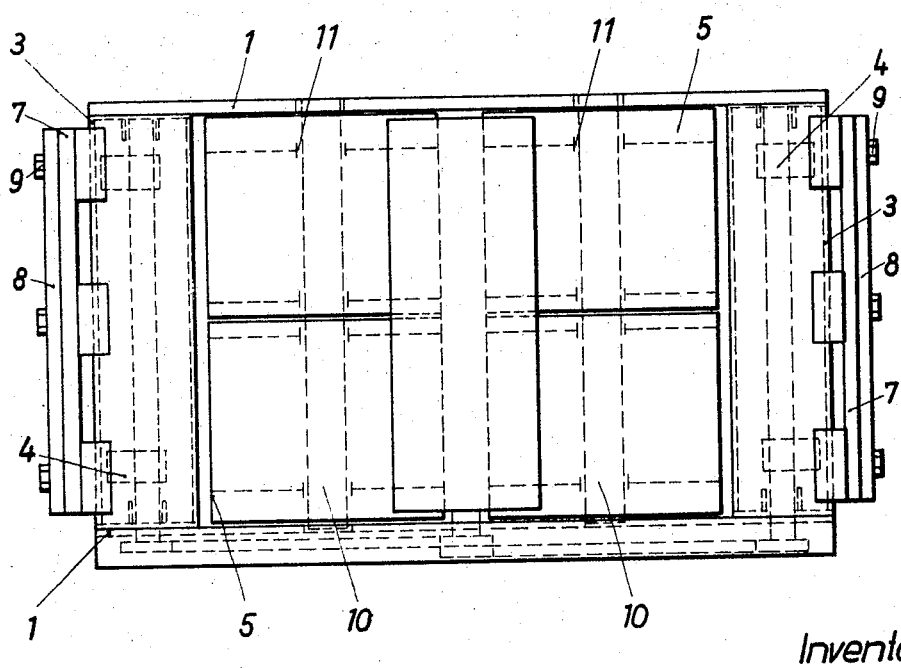
FIG. 2 is a top view of the roller shown in FIG. 1.

From FIG. 2 it can be seen that the supporting can be effected with relatively small bearings or ball bearings 11. The shaft 10 has a relatively small diameter as compared with the usual arrangement in connection with double vibration rollers with imbalance vibration generators located coaxially with respect to the roller bodies. The housings 3 of the imbalance vibration generators 4 represent strong transverse connections to the rocker arms 1.

Figure 3:
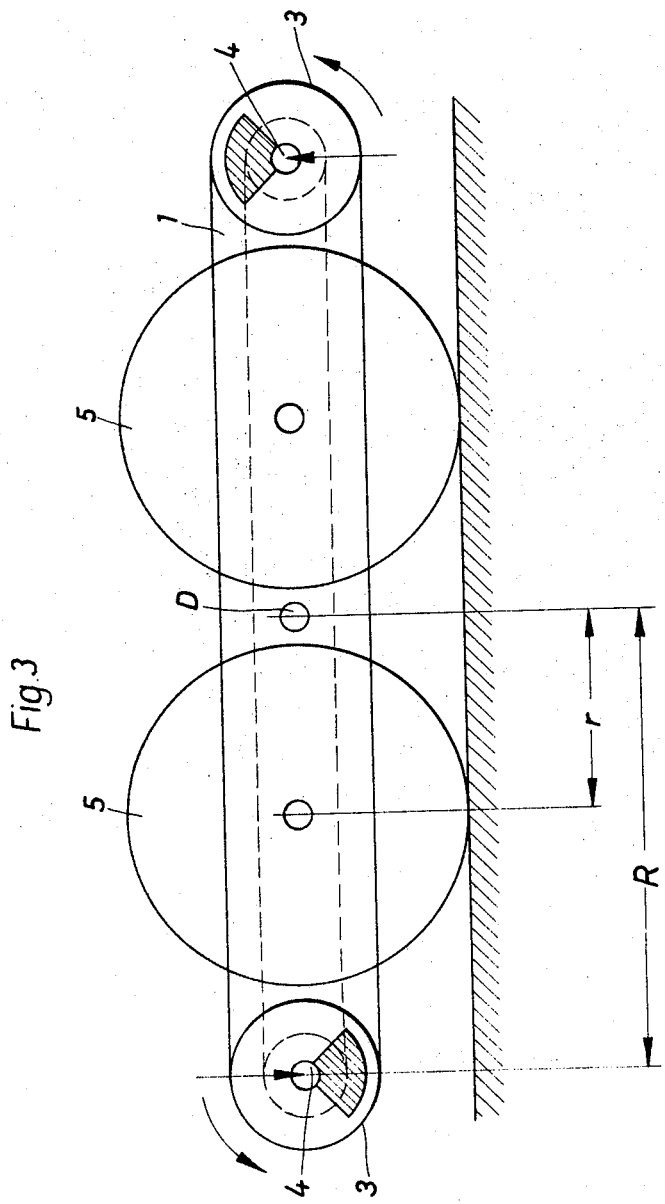
FIG. 3 shows schematically the rotary vibrating system.

In FIG. 3 there is shown the special development of the rotary oscillation system in the case of the roller in accordance with the invention, in which connection it should be noted that—as mentioned at the start—all double vibration rollers having roller bodies swinging in phase opposition represent a rotary oscillation system. The imbalance forces coming from the imbalance generators 4 act on the lever arm R. The distance between the axes of the roller bodies 5 and the center of rotation D of the system is designated as r.

Figure 4:
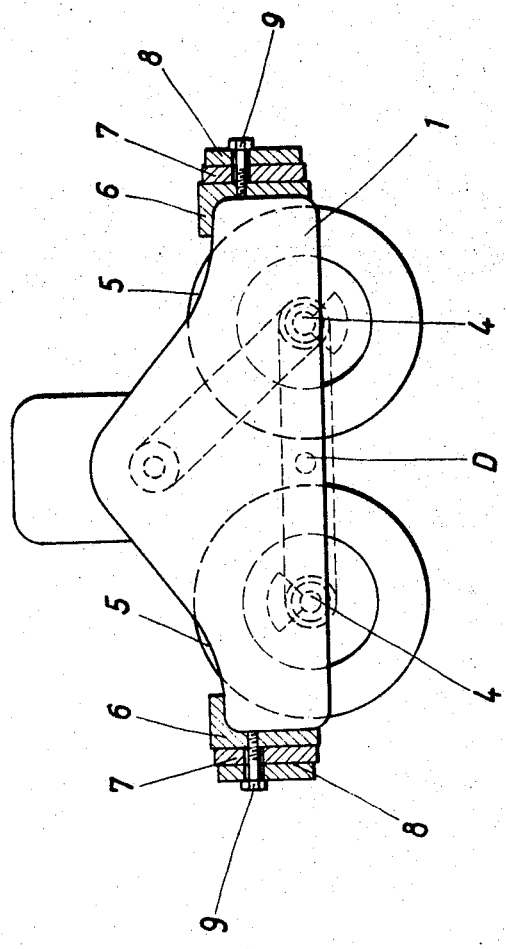
FIG. 4 shows another embodiment of a double vibration roller in accordance with the invention.

In FIG. 4 there is shown a double vibration roller in which the imbalance vibration generators 4 lie, as customary, in the shafts of the roller bodies 5. In order to increase the impact energy, only additional masses 6, 7 and 8 being provided, the masses 7 and 8 being fastened in detachable manner by means of the bolts 9.

The additional masses can also be arranged on parts which are rigidly connected to the rocker arms.

What is claimed is:

1. A ground compacting apparatus having a double vibration roller, comprising a frame having a pair of substantially parallel side arms, a pair of parallel rollers mounted between said side arms with at least one roller being driven, an imbalance oscillation generator for each said roller, said generators being mounted substantially in the plane of the axes of said rollers and on the sides thereof facing away from each other, and means to drive both said generators at the same speed of rotation with a 180° phase shift therebetween.

2. A ground compacting apparatus according to claim 1 further comprising at least one additional mass detachably mounted on each end of said side arms substantially in the plane of the axes of the rollers.

3. A ground compacting apparatus according to claim 1 further comprising housing means enclosing said imbalance generators therein, said housings being connected to said side arms transverse to the longitudinal axis of said frame.

References Cited

UNITED STATES PATENTS 3,048,089     8/1962     Kaltenegger _____ 94—50

MILTON KAUFMAN, *Primary Examiner.*